(12) United States Patent
Mukunoki et al.

(10) Patent No.: US 11,791,746 B2
(45) Date of Patent: Oct. 17, 2023

(54) POWER CONVERTER WITH COOLER AND REACTOR WITH WINDING AROUND A CORE

(71) Applicant: Mitsubishi Electric Corporation, Tokyo (JP)

(72) Inventors: Yasushige Mukunoki, Tokyo (JP); Takeshi Horiguchi, Tokyo (JP); Kimiyuki Koyanagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 336 days.

(21) Appl. No.: 17/275,676

(22) PCT Filed: Nov. 15, 2018

(86) PCT No.: PCT/JP2018/042316

§ 371 (c)(1),
(2) Date: Mar. 12, 2021

(87) PCT Pub. No.: WO2020/100260

PCT Pub. Date: May 22, 2020

(65) Prior Publication Data

US 2022/0052624 A1 Feb. 17, 2022

(51) Int. Cl.
*H02M 7/00* (2006.01)
*H02M 7/537* (2006.01)
(Continued)

(52) U.S. Cl.
CPC .......... *H02M 7/537* (2013.01); *H01F 27/025* (2013.01); *H01F 27/08* (2013.01);
(Continued)

(58) Field of Classification Search
CPC ...... H02M 7/537; H02M 7/003; H02M 3/158; H02M 1/0064; H02M 1/32; H02M 1/44;
(Continued)

(56) References Cited

U.S. PATENT DOCUMENTS 10,720,371 B2 * 7/2020 Choudhary ............ H05B 6/105
2019/0333676 A1 * 10/2019 Shin ........................ H01F 37/00
(Continued)

FOREIGN PATENT DOCUMENTS

JP  2008-186904 A  8/2008
JP  2016-197987 A  11/2016

OTHER PUBLICATIONS

International Search Report and Written Opinion dated Dec. 25, 2018, received for PCT Application PCT/JP2018/042316 Filed on Nov. 15, 2018, 7 pages including English Translation.

*Primary Examiner* — Kyle J Moody
*Assistant Examiner* — Jye-June Lee
(74) *Attorney, Agent, or Firm* — XSENSUS LLP

(57) ABSTRACT

A power converter is provided that includes a reactor that is improved in effect of cooling a core and a winding. The power converter includes: a cooling member having a first cooling surface; and a reactor including a core portion and a winding portion. The core portion is a rectangular parallelepiped and disposed on the first cooling surface that is larger in area than the core portion in a plan view. The winding is wound around the core portion and the cooling member. The power converter further includes a power conversion module connected to one end of the winding portion.

12 Claims, 11 Drawing Sheets

(51) Int. Cl.
    *H01F 27/02*     (2006.01)
    *H01F 37/00*     (2006.01)
    *H02M 3/158*     (2006.01)
    *H01F 27/08*     (2006.01)

(52) U.S. Cl.
    CPC ........... *H01F 27/085* (2013.01); *H01F 37/00* (2013.01); *H02M 3/158* (2013.01); *H02M 7/003* (2013.01)

(58) Field of Classification Search
    CPC ...... H01F 27/025; H01F 27/08; H01F 27/085; H01F 37/00
    See application file for complete search history.

(56) References Cited

U.S. PATENT DOCUMENTS

2020/0350116 A1* 11/2020 Kawaguchi ........... H01F 27/085
2021/0125768 A1* 4/2021 Chen ....................... H01F 37/00

* cited by examiner

US 11,791,746 B2

POWER CONVERTER WITH COOLER AND REACTOR WITH WINDING AROUND A CORE

CROSS-REFERENCE TO RELATED APPLICATION

The present application is based on PCT filing PCT/JP2018/042316, filed Nov. 15, 2018, the entire contents of which are incorporated herein by reference.

TECHNICAL FIELD

The present invention relates to a power converter including a power conversion module and a reactor.

BACKGROUND ART

A power converter implemented using a power conversion module including a power conversion semiconductor element performs desired power conversion by using a reactor. For example, a chopper-type DC-DC converter, and a rectification circuit and an inversion circuit in an uninterruptible power supply device each correspond to the above-mentioned power converter.

In general, a reactor includes a core filled with a magnetic flux and a winding through which a current as a source of the magnetic flux flows. Also, the reactor is formed in such a manner that the winding is wound around the core. The reactor configured in this way generates heat due to an iron loss occurring in the core and a copper loss occurring in the winding. It is considered that, when this heat generation causes burnout, for example, in an insulation coating of the winding or an insulating resin between the winding and the core, the reactor may lose its inner insulation performance to thereby deteriorate its reliability.

As conventional power converters, a power converter including a reactor and a power module circuit each disposed on a radiator is disclosed (for example, PTL 1).

In the conventional power converter disclosed in PTL 1, however, only a core is in contact with the radiator, and thus, heat is radiated to the radiator only through this core. Thus, the core is cooled directly by the radiator, but the winding is cooled through the core, so that the winding may not be sufficiently cooled.

Further, a stable operation of the reactor in the power converter inevitably requires appropriate cooling of the reactor. Further, since both the core and the winding of the reactor generate heat, it is desirable to provide a cooling mechanism effective for both the core and the winding.

Thus, as a reactor for solving the above-described problems, there is a disclosure of a reactor in which a cooling member is inserted into a gap between an EI-shaped core and a winding wound around a central leg of the E-shaped core, to thereby cool the core and the winding (for example, PTL 2).

CITATION LIST

Patent Literature

PTL 1: Japanese Patent Laying-Open No. 2016-197987
PTL 2: Japanese Patent Laying-Open No. 2008-186904

SUMMARY OF INVENTION

Technical Problem

In the conventional reactor disclosed in PTL 2, the portion cooled by the cooling member is limited to the central leg of the core and a part of the winding wound therearound. However, since the iron loss in the core occurs in the entire core filled with a magnetic flux, the core is not sufficiently cooled. Further, since the copper loss in the winding also occurs in the entire winding, the winding is not sufficiently cooled. As a result, the reactor including the core and the winding has a problem that the core and the winding are not sufficiently cooled, which may lead to deterioration in reliability.

The present invention has been made in order to solve the above-described problems. An object of the present invention is to provide a power converter including a reactor that is improved in effect of cooling a core and a winding.

Solution to Problem

A power converter according to the present invention is a power converter including: a cooling member having a first cooling surface; a reactor including a core portion and a winding portion, wherein the core portion is a rectangular parallelepiped and disposed on the first cooling surface that is larger in area than the core portion in a plan view, and the winding portion is wound around the core portion and the cooling member; and a power conversion module connected to one end of the winding portion.

Advantageous Effects of Invention

According to the present invention, the core portion is a rectangular parallelepiped and disposed on the first cooling surface of the cooling member, the first cooling surface being larger in area than the core portion in a plan view, and the winding portion is wound around the core portion and the cooling member. Thus the effect of cooling the core portion and the winding portion can be improved, so that the reliability of the power converter can be enhanced.

DESCRIPTION OF EMBODIMENTS

Figure 1:
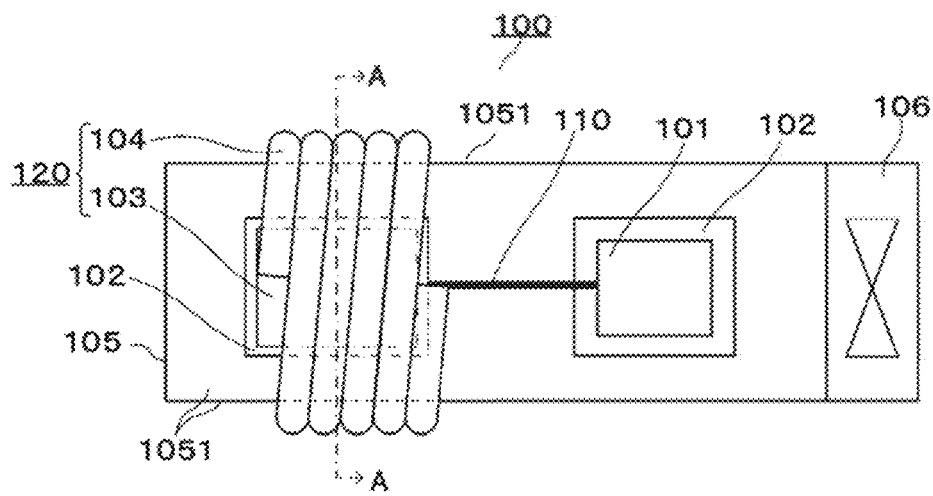
FIG. 1 is a schematic plan view showing a structure of a power converter according to the first embodiment of the present invention.

First, the entire configuration of a power converter of the present invention will be described with reference to the accompanying drawings. The figures are schematically shown and do not reflect the exact sizes of the illustrated components. The same reference characters denote the same or corresponding components throughout the specification.

FIRST EMBODIMENT

Figure 2:
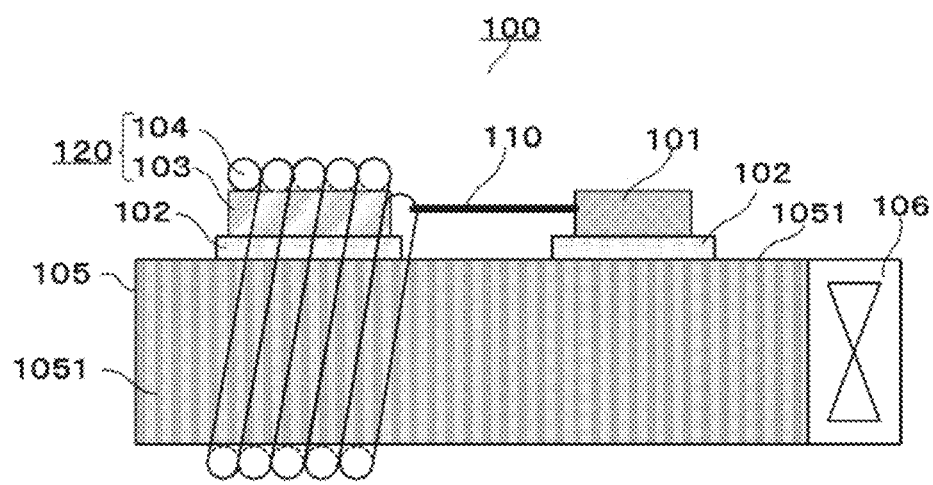
FIG. 2 is a schematic side view showing the structure of the power converter according to the first embodiment of the present invention.
Figure 3:
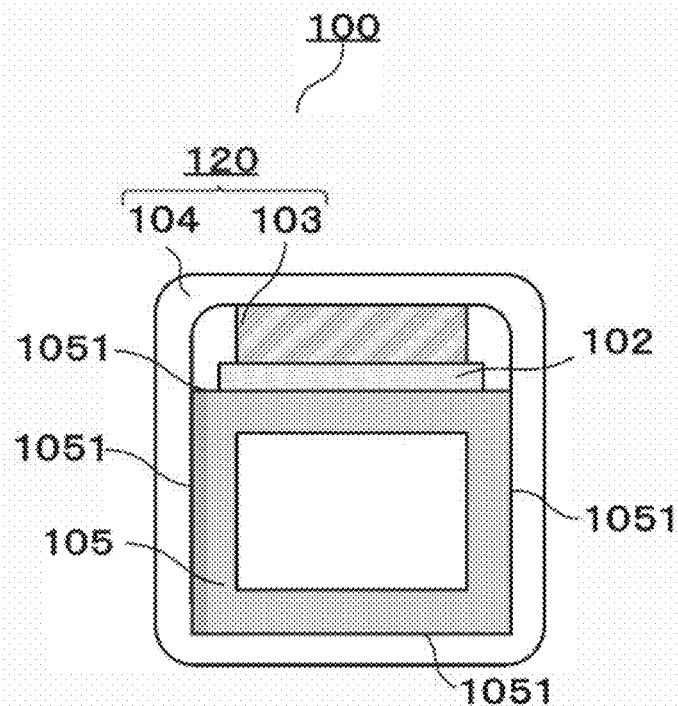
FIG. 3 is a schematic cross-sectional view showing the structure of the power converter according to the first embodiment of the present invention.

FIG. 1 is a schematic plan view showing a structure of a power converter according to the first embodiment of the present invention. FIG. 2 is a schematic side view showing the structure of the power converter according to the first embodiment of the present invention. FIG. 3 is a schematic cross-sectional view showing the structure of a power converter according to the first embodiment of the present invention. FIG. 3 is a schematic cross-sectional view taken along a dotted line A-A in FIG. 1. In the figures, a power converter 100 includes a power conversion module 101, a heat transfer member 102, a core 103 as a core portion, a winding 104 as a winding portion, a reactor 120, a cooling body 105 as a cooling member, a cooling fan 106, a wire 110, and a (first and second) cooling surface 1051. In FIG. 1, a dashed-dotted line shows heat transfer member 102 in a region covered with winding 104, and a chain double-dashed line shows core 103. In FIG. 2, winding 104 is transparent so as to transparently show heat transfer member 102, core 103 and cooling body 105 around which winding 104 is wound.

In a view of cooling body 105 as seen from the cooling fan 106 side, for convenience of description, cooling surface 1051 on which power conversion module 101 is disposed is defined as an upper surface of cooling body 105; the surface opposite to cooling surface 1051 on which power conversion module 101 is disposed is defined as a lower surface of cooling body 105; the side surface on the left side of cooling surface 1051 on which power conversion module 101 is disposed is defined as a left side surface; and the side surface on the right side of cooling surface 1051 on which power conversion module 101 is disposed is defined as a right side surface.

In the figures, cooling body 105 has at least one cooling surface 1051. Cooling body 105 has a rectangular parallelepiped outer shape and a hollow inner structure. Cooling body 105 has a plurality of plate-shaped cooling surfaces 1051. Cooling body 105 has an outer surface (a surface) formed by the plurality of cooling surfaces 1051. Cooling body 105 is provided with a space (a cavity) through which a refrigerant flows inside cooling body 105 surrounded by the plurality of cooling surfaces 1051. The surface of cooling body 105 corresponds to each cooling surface 1051 of cooling body 105. The plurality of cooling surfaces 1051 are disposed to face each other to form the surface of cooling body 105. For example, a first cooling surface 1051 is disposed at a position at which it faces a second cooling surface 1051. Also, cooling body 105 may have a hexagonal cross section or an octagonal cross section.

Cooling fan 106 generates an airflow. Cooling fan 106 is disposed on the one end side of cooling body 105. Cooling fan 106 generates an airflow that flows from the one end side of cooling body 105 toward the other end side of cooling body 105. Cooling fan 106 causes the airflow generated by cooling fan 106 to flow through cooling body 105. Thereby, the airflow (refrigerant) comes into contact with the inner surface of cooling surface 1051, so that cooling body 105 is cooled from the inside thereof. Accordingly, the members and the like disposed on the outer surface (surface) of cooling surface 1051 can be cooled. In order to achieve an excellent contact between winding 104 and cooling surface 1051, a region of cooling body 105 that comes into contact with winding 104 may be chamfered, for example, so as to facilitate contact with winding 104.

Power conversion module 101 is disposed on (brought into close contact with) cooling surface 1051 as the upper surface of cooling body 105, with heat transfer member 102 interposed therebetween. In this case, power conversion module 101 is a power module including a power conversion semiconductor element such as a silicon insulated gate bipolar transistor (IGBT). Power conversion module 101 has a one-leg configuration including a well-known two-level inversion circuit, and includes a positive electrode (P) terminal, an alternating-current (AC) terminal, and a negative electrode (N) terminal each as an external terminal (not shown). Heat transfer member 102 is made using a material such as a silicone-based heat transfer grease, for example.

Reactor 120 includes core 103 and winding 104. Reactor 120 functions as a reactor by placing winding 104 to be wound (wrapped) around core 103. For reactor 120, the inductance value of reactor 120 can be arbitrarily set in accordance with the number of times that winding 104 is wound around core 103. The inductance value can be arbitrarily set in accordance with the region (area) in which winding 104 covers core 103.

Core 103 has a rectangular parallelepiped (block) shape. Core 103 is disposed on (brought into close contact with) cooling surface 1051 as the first cooling surface of cooling body 105 with heat transfer member 102 interposed therebetween. In FIG. 1, in a plan view, the area of cooling surface 1051 of cooling body 105 is larger than the area of core 103. In other words, in a plan view, the area of core 103 is smaller than the area of cooling surface 1051 of cooling body 105 on which core 103 is disposed. Since the area of cooling surface 1051 of cooling body 105 on which core 103 is disposed is larger than the area of core 103, the area of contact between core 103 and cooling body 105 increases, so that core 103 can be efficiently cooled. As core 103, for example, a ferrite core formed using ferrite as a material is applicable. Core 103 does not have to be disposed on cooling surface 1051 of cooling body 105 with heat transfer member 102 interposed therebetween, but may be thermally connected thereto.

Winding 104 has a configuration formed by wrapping an insulator around a metal material such as copper. Winding 104 has a circular cross-sectional shape, for example. One end of winding 104 is connected using (through) wire 110 to an AC terminal of power conversion module 101. Winding 104 connected to the AC terminal of power conversion module 101 through wire 110 is wound around the outer circumferences of core 103 and cooling body 105. In this case, winding 104 is wound to cover other cooling surfaces 1051 including a cooling surface 1051 opposite to cooling surface 1051 (first cooling surface 1051) of cooling body 105 on which the core is disposed.

In particular, winding 104 is wound to cover the entire surface of a region corresponding to a position of core 103 disposed on (second) cooling surface 1051 that faces (first) cooling surface 1051 of cooling body 105 on which core 103 is disposed. In other words, winding 104 covers the entire surface of the region corresponding to the side opposite to (corresponding to cooling surface 1051 facing) the position of core 103 disposed on cooling surface 1051 of cooling body 105. Since winding 104 covers the entire surface of the position corresponding to the position of core 103 disposed on the side opposite to cooling surface 1051 of cooling body 105 on which core 103 is disposed, the magnetic flux generated in core 103 can be efficiently increased. Further, winding 104 is wound around core 103 and cooling body 105 while being in close contact with core 103 and cooling body 105, which means that winding 104 only has to be wound with a gap sufficient to allow cooling by cooling body 105, but winding 104 does not necessarily have to be in contact with cooling body 105. Further, wire 110 can be formed using a cable or a bus bar made of copper, aluminum, or the like.

In this way, in power converter 100 according to the present first embodiment, core 103 has a rectangular parallelepiped shape, core 103 is disposed on cooling surface 1051, the area of cooling body 105 is larger than the area of core 103 in a plan view, and winding 104 is wound around core 103 and cooling body 105. Thus, core 103 and winding 104 can be brought into contact with cooling surface 1051, and thereby, the effect of cooling core 103 and winding 104 can be improved.

Further, since the effect of cooling core 103 and winding 104 is improved, reactor 120 itself can be reduced in size, with the result that a small-sized and low-cost power converter can be implemented.

Further, core 103 having a rectangular parallelepiped shape alleviates the limitation imposed due to the core shape on the number of times that winding 104 is wound around core 103. Thus, the degree of design freedom for the inductance value of reactor 120 can be increased.

The following describes the operation of power converter 100.

Power converter 100 performs power conversion through the use of the switching operation of the power conversion semiconductor element included in power conversion module 101. At this time, the power conversion semiconductor element loses part of the power. This loss is a conduction loss or a switching loss in the power conversion semiconductor element. Due to such a loss, the power conversion semiconductor element generates heat and increases in temperature. For the power conversion semiconductor element, the operation guaranteed temperature is defined in advance. Thus, in order to appropriately (stably) use (operate) power conversion module 101, appropriate cooling is required. In the present embodiment, power conversion module 101 on which the power conversion semiconductor element is mounted is brought into close contact with cooling body 105 with heat transfer member 102 interposed therebetween, and cooled by the airflow generated by cooling fan 106.

As described above, core 103 and winding 104 form reactor 120. Reactor 120 receives fluctuations in rectangular wave voltage output from (generated by) power conversion module 101, and smoothes the current so as to be inversely proportional to the inductance value of reactor 120. At this time, reactor 120 including core 103 and winding 104 loses part of the power. This loss results from an iron loss occurring in core 103 and a copper loss occurring in winding 104. Due to this loss, core 103 and winding 104 may generate heat and thereby increase in temperature.

Heat generation in reactor 120 induces (causes) a failure in reactor 120 itself. For example, heat generation in reactor 120 causes burnout in the insulation coating of winding 104. This burnout in the insulation coating may deteriorate the insulation performance of winding 104, thereby leading to a short circuit failure between the adjacent metal materials of wound winding 104 or between winding 104 and core 103. Further, heat generation in reactor 120 may also prevent size reduction of reactor 120. In other words, size reduction of reactor 120 may increase the heat generation density in reactor 120, and thus, reactor 120 may further increase in temperature.

However, in the present first embodiment, since core 103 is disposed in close contact with cooling surface 1051 of cooling body 105 with heat transfer member 102 interposed therebetween, core 103 can be efficiently cooled. Similarly to core 103, since winding 104 is disposed in close contact with cooling surface 1051 of cooling body 105, winding 104 can be efficiently cooled. In other words, in reactor 120, core 103 and winding 104 are disposed in contact with cooling body 105 as described above, so that core 103 and winding 104 can be efficiently cooled.

Further, reactor 120 and power conversion module 101 are disposed on the same cooling body 105 so as to reduce the length of wire 110 that connects reactor 120 and power conversion module 101. Accordingly, the inductance value resulting from wire 110 can be decreased, and thus, the surge voltage generated at the terminal of reactor 120 can be decreased.

In power converter 100 configured as described above, core 103 has a rectangular parallelepiped shape, core 103 is disposed on cooling surface 1051, the area of cooling surface 1051 is larger than the area of core 103 in a plan view, and winding 104 is wound around core 103 and cooling body 105. Thus, core 103 and winding 104 can be brought into contact with cooling surface 1051, and thereby, the effect of cooling core 103 and winding 104 can be improved, so that the reliability of the power converter can be enhanced.

Further, since the effect of cooling core 103 and winding 104 is improved, reactor 120 itself can be reduced in size, so that a small-sized and low-cost power converter can be implemented.

Further, core 103 having a rectangular parallelepiped shape alleviates the limitation imposed due to the core shape on the number of times that winding 104 is wound around core 103. Thus, the degree of design freedom for the inductance value of reactor 120 can be increased.

Further, the number of times that winding 104 is wound around core 103 and cooling body 105 can be readily adjusted, so that a power converter with a high degree of design freedom is implemented.

Further, since power conversion module 101 and reactor 120 that includes core 103 and winding 104 are disposed on the same cooling body 105, a small-sized power converter can be implemented.

Further, since the distance (interval) between power conversion module 101 and reactor 120 is reduced, the surge voltage generated at the terminal of reactor 120 by the inductance component of wire 110 can be decreased.

Further, core 103 can be made using a commercially available ferrite core, and cooling body 105 can be formed by applying a commercially available heat sink. Thus, a low-cost power converter with a high degree of design freedom can be implemented through the use of inexpensive general-purpose components.

Although the present first embodiment has been described with reference to a silicon IGBT as a power conversion semiconductor element applied to a power conversion module, the present invention is not limited thereto. For example, silicon carbide (SiC) that is a wide band gap semiconductor may also be applicable. Also, a diode and a metal oxide semiconductor field effect transistor (MOSFET) each made of SiC may also be mounted on power conversion module 101. Further, gallium nitride (GaN) that is a wide band gap semiconductor can also be applicable.

The above-mentioned wide band gap power conversion semiconductor element allows a high-speed switching operation as compared with the above-mentioned silicon IGBT, with the result that a reactor can be further reduced in size. Thus, by applying a wide band gap semiconductor to the present first embodiment, a small-sized power converter can be implemented. As a wide band gap semiconductor material, diamond and gallium oxide can also be similarly applicable.

Further, although a ferrite core has been described as core 103, core 103 is not limited to the above-mentioned ferrite core, but a silicon steel plate, amorphous metal, and a dust core may also be applicable, for example.

Winding 104 having a circular cross-sectional shape is herein applied, but a winding having a plate shape may also be applicable.

Further, although the cooling method (cooling means) has been described with reference to forced cooling by cooling body 105 using the cooling air (airflow) from cooling fan 106, the cooling method is not limited to such a forced cooling method. For example, a water-cooling method utilizing a fluid cooling medium with an external pump is also applicable.

Second Embodiment

The second embodiment is different from the first embodiment in that it includes a region where winding 104 used in the first embodiment is wound around cooling body 105 while being in direct contact with cooling surface 1051 of cooling body 105 on the outer circumferential portion of core 103. In this way, there is a region where winding 104 is in direct contact with cooling surface 1051 of cooling body 105, and thereby, the effect of cooling winding 104 can be improved in the region where winding 104 is in direct contact with cooling surface 1051. Further, winding 104 is wound around cooling body 105 on the outer circumferential portion of core 103, to thereby allow positioning of cooling body 105, and thus, winding 104 can also function as a fixing tool for cooling body 105. Since other features are the same as those in the first embodiment, the detailed description thereof will not be repeated.

Figure 4:
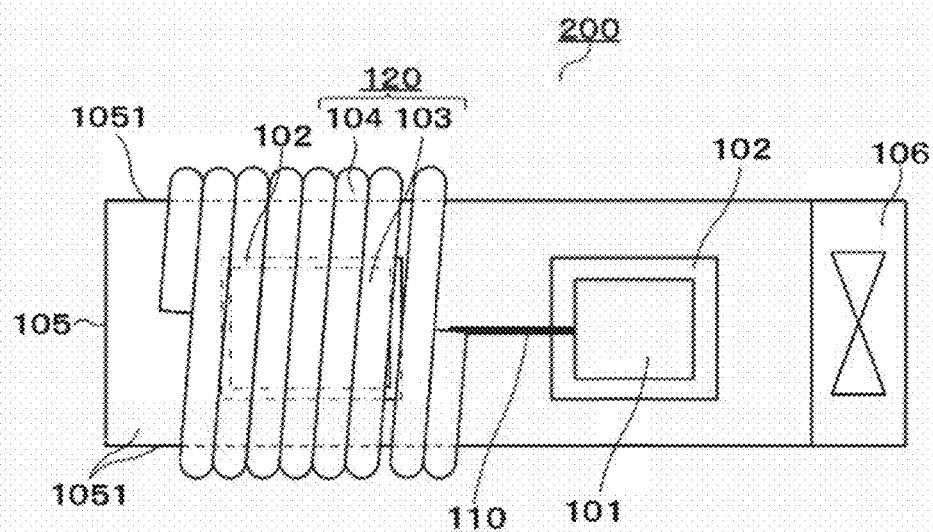
FIG. 4 is a schematic plan view showing a structure of a power converter according to the second embodiment of the present invention.
Figure 5:
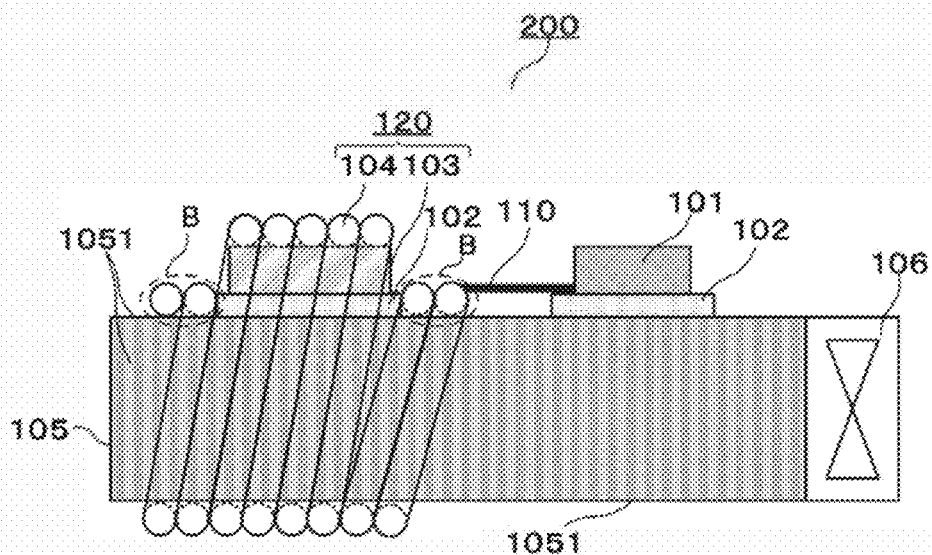
FIG. 5 is a schematic side view showing the structure of the power converter according to the second embodiment of the present invention.

FIG. 4 is a schematic plan view showing a structure of a power converter according to the second embodiment of the present invention. FIG. 5 is a schematic side view showing the structure of the power converter according to the second embodiment of the present invention. In the figures, a power converter 200 includes a power conversion module 101, a heat transfer member 102, a core 103 as a core portion, a winding 104 as a winding portion, a reactor 120, a cooling body 105 as a cooling member, a cooling fan 106, a wire 110, and a cooling surface 1051. In FIG. 4, a dashed-dotted line shows heat transfer member 102 in a region covered with winding 104, and a chain double-dashed line shows core 103. In FIG. 5, winding 104 is transparent so as to transparently show heat transfer member 102, core 103 and cooling body 105 around which winding 104 is wound. Further, a region B is an outer circumferential region of core 103, where winding 104 is in direct contact with cooling surface 1051 of cooling body 105.

In FIGS. 4 and 5, in region B on cooling surface 1051 on the outer circumferential side of the region where core 103 is disposed, a part of winding 104 is wound around only cooling body 105 (cooling surface 1051).

Winding 104 having one end connected to power conversion module 101 through wire 110 is first wound from the power conversion module 101 side to extend around cooling body 105 (including region B) in the outer circumferential region of the position where core 103 is disposed. Then, winding 104 is subsequently wound around the outer circumferences of core 103 and cooling body 105. Further, winding 104 is wound around cooling body 105 (including region B) in the outer circumferential region of the position of core 103 located on the side opposite to the position where power conversion module 101 is disposed.

In this way, in the present second embodiment, a part of winding 104 is wound around cooling body 105 while being in direct contact with cooling surface 1051 of cooling body 105 in the outer circumferential region of the position where core 103 is disposed. Thus, winding 104 can function as a fixing tool for core 103, which eliminates the need to provide a special member for fixing core 103, with the result that a simple and low-cost power converter 200 can be implemented. Further, since winding 104 is brought into direct contact with cooling surface 1051 of cooling body 105, the effect of cooling winding 104 by cooling body 105 can be improved.

In power converter 200 configured as described above, core 103 has a rectangular parallelepiped shape, core 103 is disposed on cooling surface 1051, the area of cooling surface 1051 is larger than the area of core 103 in a plan view, and winding 104 is wound around core 103 and cooling body 105. Thus, core 103 and winding 104 can be brought into contact with cooling surface 1051, and thereby, the effect of cooling core 103 and winding 104 can be improved, so that the reliability of the power converter can be enhanced.

Further, since the effect of cooling core 103 and winding 104 is improved, reactor 120 itself can be reduced in size, and thus, a small-sized and low-cost power converter can be implemented.

Further, core 103 having a rectangular parallelepiped shape alleviates the limitation imposed due to the core shape on the number of times that winding 104 is wound around core 103. Thus, the degree of design freedom for the inductance value of reactor 120 can be increased.

Further, the number of times that winding 104 is wound around core 103 and cooling body 105 can be readily adjusted, so that a power converter with a high degree of design freedom is implemented.

Further, since power conversion module 101 and reactor 120 that includes core 103 and winding 104 are disposed on the same cooling body 105, a small-sized power converter can be implemented.

Further, since the distance (interval) between power conversion module 101 and reactor 120 is reduced, the surge voltage generated at the terminal of reactor 120 can be decreased.

Further, core 103 can be made using a commercially available ferrite core, and cooling body 105 can be formed by applying a commercially available heat sink. Thus, a low-cost power converter with a high degree of design freedom can be implemented through the use of inexpensive general-purpose components.

Further, a part of winding 104 is wound around cooling body 105 while being in direct contact with cooling surface 1051 of cooling body 105. Thus, winding 104 can function as a fixing tool for core 103, which eliminates the need to provide a special member for fixing core 103, with the result that a simple and low-cost power converter can be implemented.

Further, since winding 104 is in direct contact with cooling surface 1051 of cooling body 105, the effect of cooling winding 104 by cooling body 105 can be improved.

Third Embodiment

The third embodiment is different from the second embodiment in that: winding 104 used in the second embodiment is wound around cooling body 105 along grooves 3051 and 3052 for placing and guiding of winding 104 that are formed on: the surface of cooling surface 1051 of cooling body 105 in the outer circumferential region (the outer circumferential portion) of core 103; and the surface of cooling surface 1051 of cooling body 105 opposite to the side on which core 103 is disposed. In this way, cooling surface 1051 is provided with grooves 3051 and 3052 along which winding 104 is disposed and guided. Thereby, winding 104 can be fixed without requiring a special positioning jig for winding 104 and a holding tool for winding 104. Further, winding 104 is disposed in grooves 3051 and 3052, to thereby increase the region in which winding 104 is in direct contact with cooling surface 1051, so that the effect of cooling winding 104 can be improved. Since other features are the same as those in the second embodiment, the detailed description thereof will not be repeated.

Figure 6:
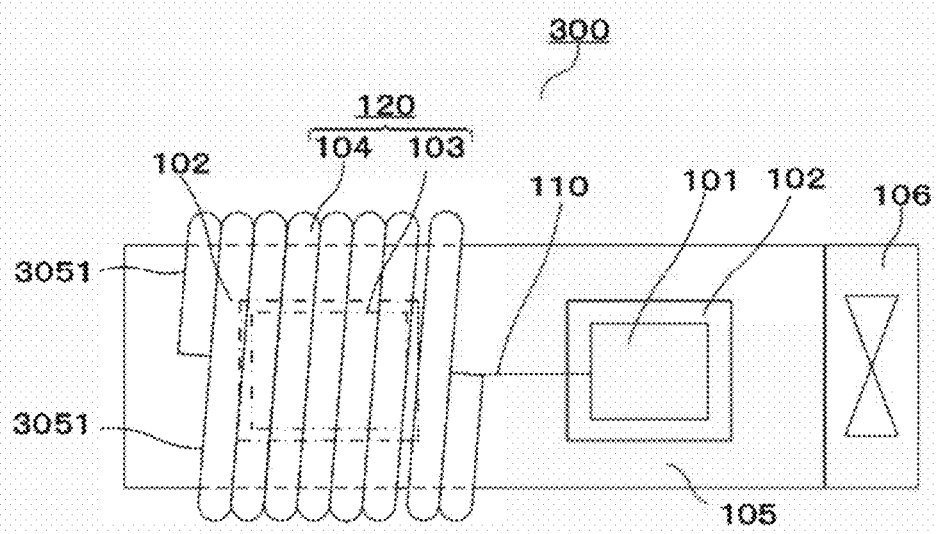
FIG. 6 is a schematic plan view showing a structure of a power converter according to the third embodiment of the present invention.
Figure 7:
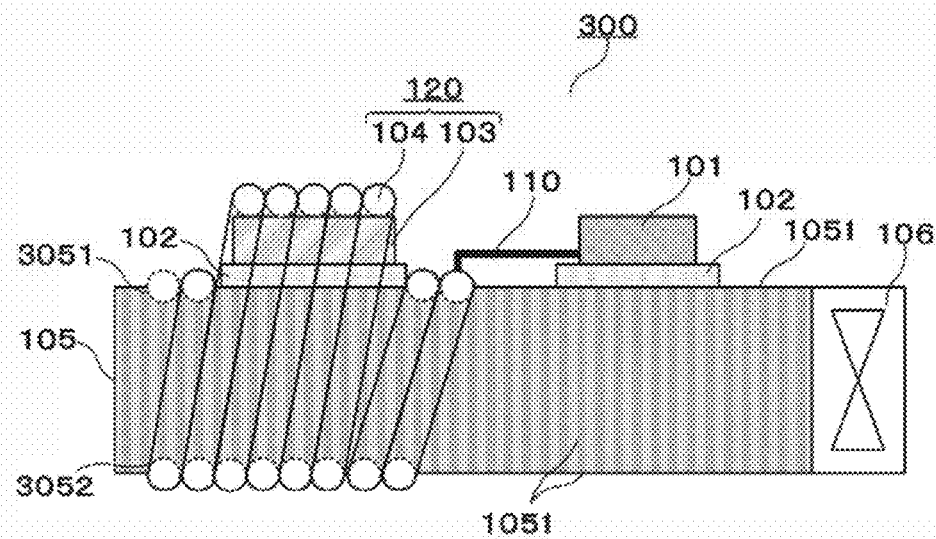
FIG. 7 is a schematic side view showing the structure of the power converter according to the third embodiment of the present invention.

FIG. 6 is a schematic plan view showing a structure of a power converter according to the third embodiment of the present invention. FIG. 7 is a schematic side view showing the structure of the power converter according to the third embodiment of the present invention. In the figures, a power converter 300 includes a power conversion module 101, a heat transfer member 102, a core 103 as a core portion, a winding 104 as a winding portion, a reactor 120, a cooling body 105 as a cooling member, a cooling fan 106, a wire 110, a cooling surface 1051, and grooves 3051 and 3052 each as a groove portion. In FIG. 6, a dashed-dotted line shows heat transfer member 102 in a region covered with winding 104, and a chain double-dashed line shows core 103. In FIG. 7, winding 104 is transparent so as to transparently show heat transfer member 102, core 103, and cooling body 105 around which winding 104 is wound.

In FIG. 7, cooling body 105 is provided with groove 3051 along which winding 104 is disposed and guided. Groove 3051 is provided on the surface of a cooling surface 1051 on which power conversion module 101 is disposed. Also, cooling body 105 is provided with groove 3052 along which winding 104 is guided. Groove 3052 is provided on the surface of a cooling surface 1051 opposite to cooling surface 1051 on which the power conversion module is disposed. In other words, grooves 3051 and 3052 are provided in the outer circumferential portion of cooling body 105. Groove 3052 is provided in: a portion of cooling surface 1051 that corresponds to the outer circumferential portion (circumference) of core 103; and a portion of cooling surface 1051 that corresponds to core 103. Winding 104 is guided along groove 3051 and groove 3052 to be wound around core 103 and cooling body 105.

In this way, in the present third embodiment, grooves 3051 and 3052 along which winding 104 is disposed and guided are provided on the surface of cooling surface 1051 of cooling body 105. Thus, winding 104 can be fixed to cooling body 105 without requiring a special positioning jig and a holding tool for winding 104 to be wound around core 103 and cooling body 105. Also, a simple and low-cost power converter 300 can be implemented.

In FIG. 7, cooling body 105 is provided with: groove 3051 on cooling surface 1051 on which power conversion module 101 is disposed; and groove 3052 on cooling surface 1051 opposite to cooling surface 1051 on which power conversion module 101 is disposed, but the positions where grooves 3051 and 3052 are provided are not limited to the above-mentioned cooling surfaces 1051. The effect can also be achieved, for example, even when a groove is provided only on cooling surface 1051 of cooling body 105 on which a power conversion module is disposed, or only on cooling surface 1051 opposite to cooling surface 1051 on which a power conversion module is disposed. Also, the same effect can be achieved even when a groove is provided on each side surface side of cooling surface 1051 of cooling body 105 on which power conversion module 101 is disposed, and on all cooling surfaces 1051 of cooling body 105.

The following describes a modification of the present third embodiment. Another embodiment of the present third embodiment is different from the above-described third embodiment in that grooves 3051 and 3052 provided on the surface side of cooling surface 1051 have depths sufficient to allow winding 104 to be buried therein. Since grooves 4051 and 4052 along which winding 104 is buried and guided are provided on the surface side of cooling surface 1051 in this way, winding 104 can be fixed without requiring a special positioning jig for winding 104 and a holding tool for winding 104. Further, winding 104 is disposed within grooves 4051 and 4052, to thereby increase the area in which winding 104 is in direct contact with cooling surface 1051, so that the effect of cooling winding 104 can be improved. Further, since winding 104 is buried in grooves 4051 and 4052, any protrusion of winding 104 from cooling surface 1051 can be prevented from occurring, for example, on a cooling surface 1051 opposite to cooling surface 1051 on which power conversion module 101 is provided. Accordingly, a power converter 400 can be readily installed in another housing (not shown). Further, by providing a well-known screw hole in cooling body 105, power converter 400 can be installed in another housing, thereby implementing a power converter with a high degree of design freedom. Since other features are the same as those in the second embodiment, the detailed description thereof will not be repeated.

Figure 8:
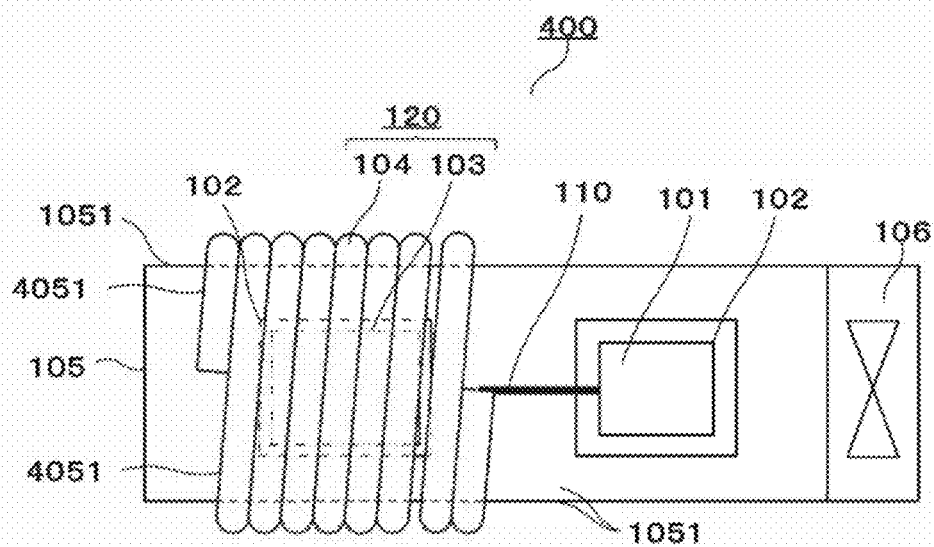
FIG. 8 is a schematic plan view showing a structure of another power converter according to the third embodiment of the present invention.
Figure 9:
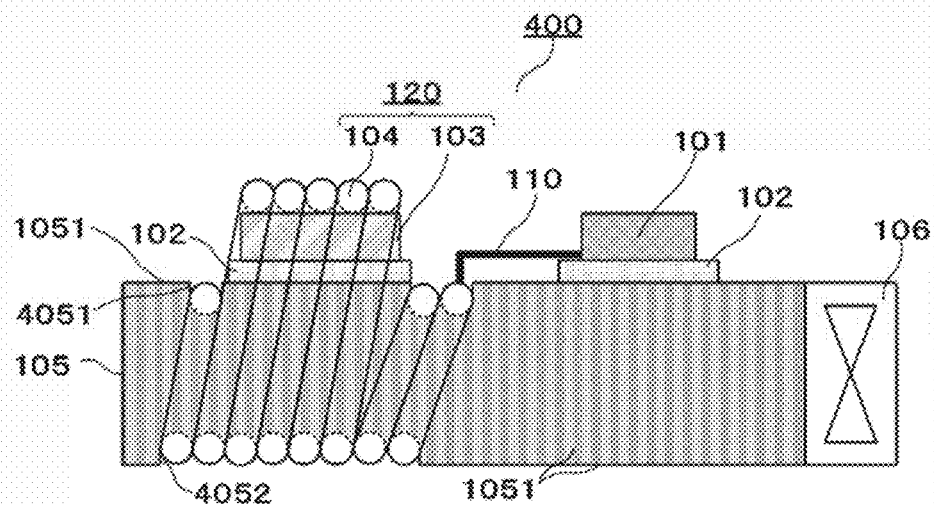
FIG. 9 is a schematic side view showing the structure of another power converter according to the third embodiment of the present invention.

FIG. 8 is a schematic plan view showing a structure of another power converter according to the third embodiment of the present invention. FIG. 9 is a schematic side view showing the structure of another power converter according to the third embodiment of the present invention. In the figures, power converter 400 includes a power conversion module 101, a heat transfer member 102, a core 103 as a core portion, a winding 104 as a winding portion, a reactor 120, a cooling body 105 as a cooling member, a cooling fan 106, a wire 110, and grooves 4051 and 4052 each as a groove portion. In FIG. 8, a dashed-dotted line shows heat transfer member 102 in a region covered with winding 104, and a chain double-dashed line shows core 103. In FIG. 9, winding 104 is transparent so as to transparently show heat transfer member 102, core 103, and cooling body 105 around which winding 104 is wound.

In FIG. 9, cooling body 105 is provided with a groove 4051 having a depth allowing winding 104 to be buried therein and guided therethrough. Groove 4051 is provided on the surface side of cooling surface 1051 on which power conversion module 101 is disposed. Also, cooling body 105 is provided with a groove 4052 having a depth allowing winding 104 to be buried therein and guided therethrough. Groove 4052 is provided on a cooling surface 1051 opposite to cooling surface 1051 on which the power conversion module is disposed. In other words, grooves 4051 and 4052 are provided in the outer circumferential portion (circumference) of cooling body 105. Groove 4052 is provided in a portion of cooling surface 1051 that corresponds to the outer circumferential portion of core 103 and a portion of cooling surface 1051 that corresponds to core 103. Then, winding 104 is buried in groove 4051 and groove 4052 and guided therethrough to be wound around core 103 and cooling body 105.

In this way, in another embodiment of the present third embodiment, grooves 4051 and 4052 are provided on the surface side of cooling surface 1051 of cooling body 105 so as to allow winding 104 to be buried therein and guided therethrough. Thus, winding 104 can be fixed without requiring a special positioning jig and a holding tool for winding 104 to be wound around core 103 and cooling body 105. Also, simple and low-cost power converter 400 can be implemented. Further, winding 104 is buried in grooves 4051 and 4052. Thus, any protrusion of winding 104 from cooling surface 1051 can be prevented from occurring, for example, on a cooling surface 1051 opposite to cooling surface 1051 on which power conversion module 101 is provided. Accordingly, power converter 400 can be readily installed in another housing (not shown). Further, by providing a well-known screw hole in cooling body 105, power converter 400 can be installed in another housing, so that a power converter with a high degree of design freedom is implemented.

In FIG. 9, cooling body 105 is provided with: groove 4051 on the surface side of cooling surface 1051 on which power conversion module 101 is disposed; and groove 4052 on a cooling surface 1051 opposite to cooling surface 1051 on which power conversion module 101 is disposed, but the positions where grooves 4051 and 4052 are provided are not limited to the above-mentioned cooling surfaces 1051. The effect can also be achieved, for example, even when a groove is provided only on cooling surface 1051 of cooling body 105 on which the power conversion module is disposed, or only on cooling surface 1051 opposite to cooling surface 1051 on which the power conversion module is disposed. Also, the same effect can be achieved even when a groove is provided on each side surface side of cooling surface 1051 of cooling body 105 on which power conversion module 101 is disposed and on all cooling surfaces 1051 of cooling body 105.

In each of power converters 300 and 400 configured as described above, core 103 has a rectangular parallelepiped shape, core 103 is disposed on cooling surface 1051, the area of cooling surface 1051 is larger than the area of core 103 in a plan view, and winding 104 is wound around core 103 and cooling body 105. Thus, core 103 and winding 104 can be brought into contact with cooling surface 1051, and thereby, the effect of cooling core 103 and winding 104 can be improved, so that the reliability of the power converter can be enhanced.

Further, since the effect of cooling core 103 and winding 104 is improved, reactor 120 itself can be reduced in size, so that a small-sized and low-cost power converter can be implemented.

Further, core 103 having a rectangular parallelepiped shape alleviates the limitation imposed due to the core shape on the number of times that winding 104 is wound around core 103. Thus, the degree of design freedom for the inductance value of reactor 120 can be increased.

Further, the number of times that winding 104 is wound around core 103 and cooling body 105 can be readily adjusted, so that a power converter with a high degree of design freedom is implemented.

Further, since power conversion module 101 and reactor 120 that includes core 103 and winding 104 are disposed on the same cooling body 105, a small-sized power converter can be implemented.

Further, since the distance (interval) between power conversion module 101 and reactor 120 is reduced, the surge voltage generated at the terminal of reactor 120 can be decreased.

Further, core 103 can be made using a commercially available ferrite core, and cooling body 105 can be formed by applying a commercially available heat sink. Thus, a low-cost power converter with a high degree of design freedom can be implemented through the use of inexpensive general-purpose components.

Further, a part of winding 104 is wound around cooling body 105 while being in direct contact with cooling surface 1051 of cooling body 105. Thus, winding 104 can function as a fixing tool for core 103, which eliminates the need to provide a special member for fixing core 103, with the result that a simple and low-cost power converter can be implemented.

Further, since winding 104 is brought into direct contact with cooling surface 1051 of cooling body 105, the effect of cooling winding 104 by cooling body 105 can be improved.

Further, grooves 3051 and 3052 along which winding 104 is guided are provided on the surface side of cooling surface 1051 of cooling body 105. Thus, winding 104 can be fixed without requiring a special positioning jig and a holding tool for winding 104 to be wound around core 103 and cooling body 105.

Further, since grooves 4051 and 4052 are formed to have depths allowing winding 104 to be buried therein, and winding 104 is buried in grooves 4051 and 4052. Thus, any protrusion of winding 104 from cooling surface 1051 can be prevented from occurring, for example, on a cooling surface 1051 opposite to cooling surface 1051 on which power conversion module 101 is provided. Accordingly, power converter 400 can be readily installed in another housing (not shown).

Fourth Embodiment

The fourth embodiment is different from the first embodiment in that a fixing tool 507 is provided for fixing power converter 100 used in the first embodiment to another housing (not shown). Since fixing tool 507 is used for fixation to another housing in this way, the fixing operation can be readily performed. Since other features are the same as those in the first embodiment, the detailed description thereof will not be repeated.

Figure 10:
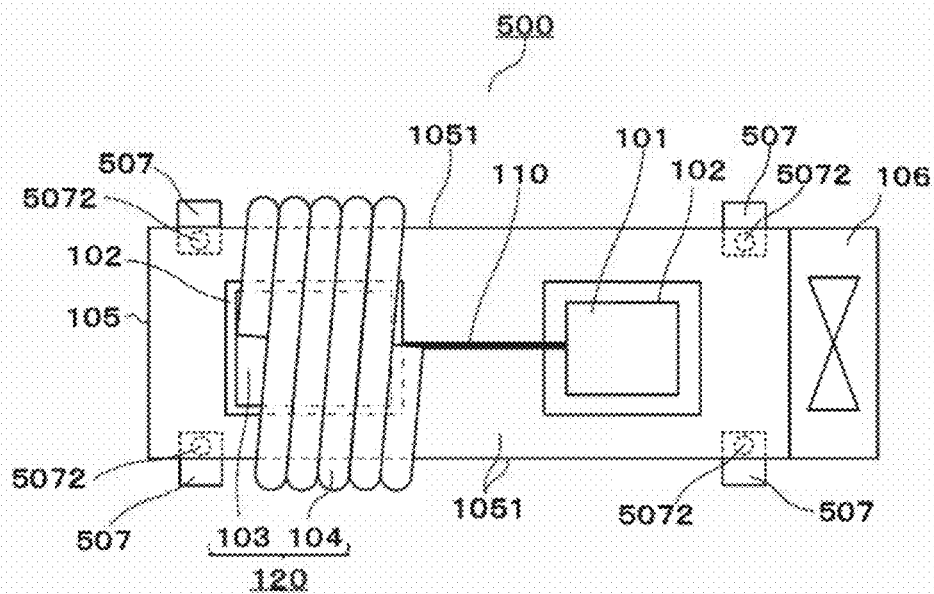
FIG. 10 is a schematic plan view showing a structure of a power converter according to the fourth embodiment of the present invention.
Figure 11:
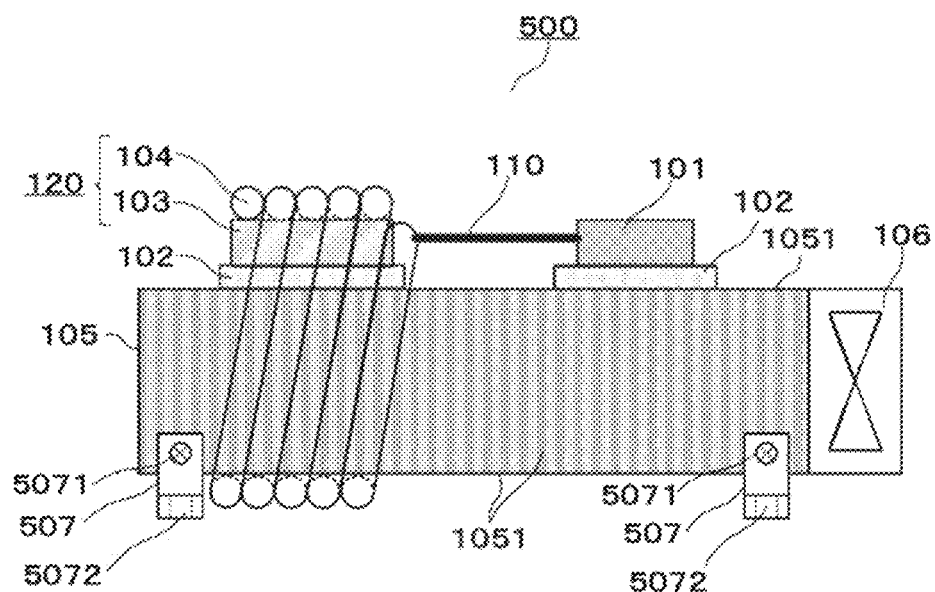
FIG. 11 is a schematic side view showing the structure of the power converter according to the fourth embodiment of the present invention.

FIG. 10 is a schematic plan view showing a structure of a power converter according to the fourth embodiment of the present invention. FIG. 11 is a schematic side view showing the structure of the power converter according to the fourth embodiment of the present invention. In the figures, a power converter 500 includes a power conversion module 101, a heat transfer member 102, a core 103 as a core portion, a winding 104 as a winding portion, a reactor 120, a cooling body 105 as a cooling member, a cooling fan 106, a wire 110, a cooling surface 1051, and a fixing tool 507 as a fixing member. In FIG. 10, a dashed-dotted line shows heat transfer member 102 in a region covered with winding 104, and a chain double-dashed line shows core 103. In FIG. 11, winding 104 is transparent so as to transparently show heat transfer member 102, core 103, and cooling body 105 around which winding 104 is wound.

In FIGS. 10 and 11, fixing tool 507 has an L-shape. Fixing tool 507 has screw holes 5071 and 5072 on both ends of this L-shape. Fixing tool 507 is fixed to cooling body 105 by screwing through screw hole 5071. Further, fixing tool 507 can be fixed to another housing (not shown) by screwing through screw hole 5072. Fixing tools 507 are disposed on both sides of winding 104 in cooling body 105.

In this way, since fixing tool 507 is provided in the present fourth embodiment, power converter 500 can be fixed to another housing through the use of fixing tool 507.

In power converter 500 configured as described above, core 103 has a rectangular parallelepiped shape, core 103 is disposed on cooling surface 1051, the area of cooling surface 1051 is larger than the area of core 103 in a plan view, and winding 104 is wound around core 103 and cooling body 105. Thus, core 103 and winding 104 can be brought into contact with cooling surface 1051, and thereby, the effect of cooling core 103 and winding 104 can be improved, so that the reliability of the power converter can be enhanced.

Further, since the effect of cooling core 103 and winding 104 is improved, reactor 120 itself can be reduced in size, so that a small-sized and low-cost power converter can be implemented.

Further, core 103 having a rectangular parallelepiped shape alleviates the limitation imposed due to the core shape on the number of times that winding 104 is wound around core 103. Thus, the degree of design freedom for the inductance value of reactor 120 can be increased.

Further, the number of times that winding 104 is wound around core 103 and cooling body 105 can be readily adjusted, so that a power converter with a high degree of design freedom is implemented.

Further, since power conversion module 101 and reactor 120 that includes core 103 and winding 104 are disposed on the same cooling body 105, a small-sized power converter can be implemented.

In addition, since the distance (interval) between power conversion module 101 and reactor 120 is reduced, the surge voltage generated at the terminal of reactor 120 can be decreased.

Further, core 103 can be made using a commercially available ferrite core, and cooling body 105 can be formed by applying a commercially available heat sink. Thus, a low-cost power converter with a high degree of design freedom can be implemented through the use of inexpensive general-purpose components.

Further, power converter 500 is fixed to another housing with fixing tool 507 interposed therebetween. Thus, the operation of fixing to another housing is readily performed, and thereby, a power converter with high operation efficiency is implemented.

Fifth Embodiment

The present fifth embodiment is different in core 103 used in the first embodiment in the point that a plurality of cores 103 are arranged side by side in the direction perpendicular to the magnetic flux inside winding 104 that is generated by the current flowing through winding 104. In this way, since the plurality of cores 103 are arranged side by side in the direction perpendicular to the magnetic flux inside winding 104 that is generated by the current flowing through winding 104, the inductance value can be adjusted in accordance with the number of cores 103, and thus, a power converter with a high degree of design freedom can be implemented. Since other features are the same as those in the first embodiment, the detailed description thereof will not be repeated.

Figure 12:
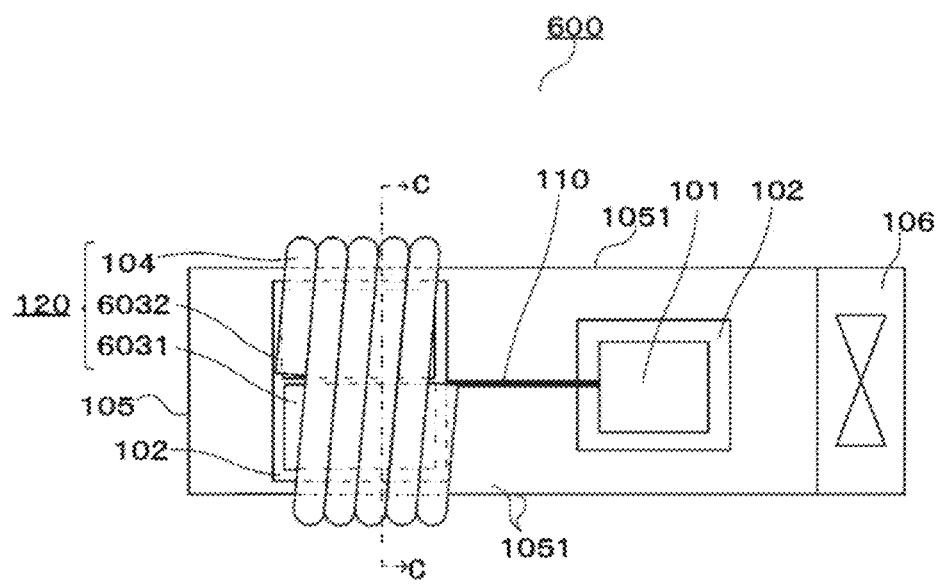
FIG. 12 is a schematic plan view showing a structure of a power converter according to the fifth embodiment of the present invention.
Figure 13:
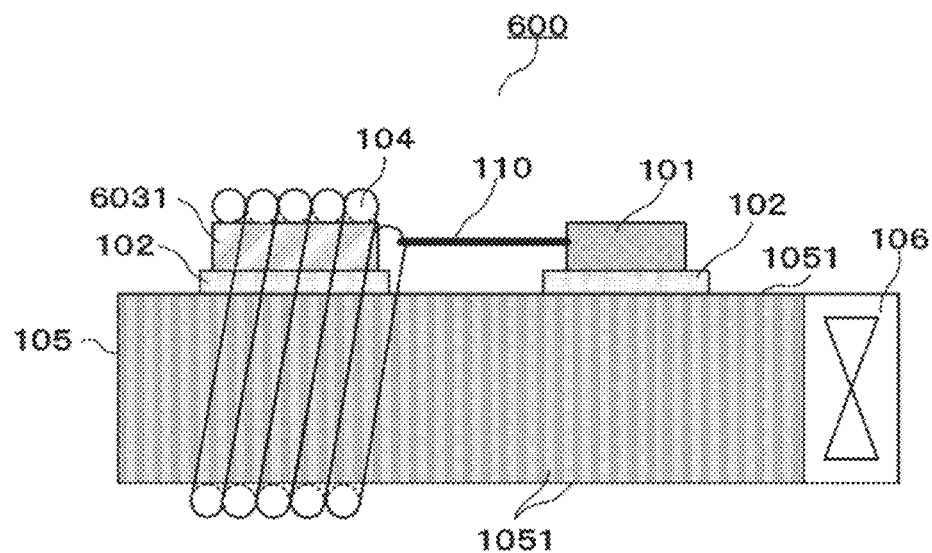
FIG. 13 is a schematic side view showing the structure of the power converter according to the fifth embodiment of the present invention.
Figure 14:
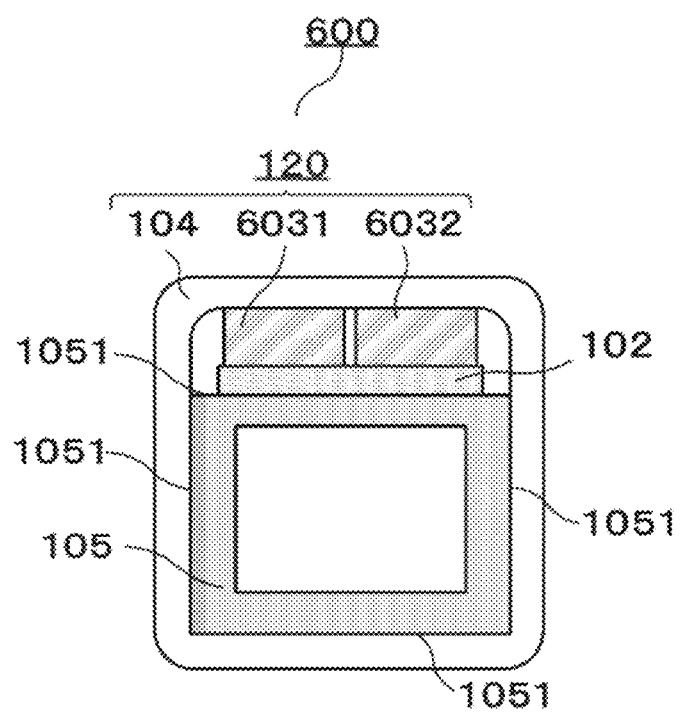
FIG. 14 is a schematic cross-sectional view showing the structure of the power converter according to the fifth embodiment of the present invention.

FIG. 12 is a schematic plan view showing a structure of a power converter according to the fifth embodiment of the present invention. FIG. 13 is a schematic side view showing the structure of the power converter according to the fifth embodiment of the present invention. FIG. 14 is a schematic cross-sectional view showing the structure of the power converter according to the fifth embodiment of the present invention. FIG. 14 is a schematic cross-sectional view taken along a dotted line C-C in FIG. 12. In the figures, a power converter 600 includes a power conversion module 101, a heat transfer member 102, a core 6031 as the first core portion, a core 6032 as the second core portion, a winding 104 as a winding portion, a reactor 120, a cooling body 105 as a cooling member, a cooling fan 106, a wire 110, and a cooling surface 1051. In FIG. 12, a dashed-dotted line shows heat transfer member 102 in a region covered with winding 104, and a chain double-dashed line shows core 103. In FIG. 13, winding 104 is transparent so as to transparently show heat transfer member 102, first core 6031, and cooling body 105 around which winding 104 is wound.

In FIGS. 12 and 14, first core 6031 and second core 6032 are arranged side by side on cooling surface 1051 of cooling body 105 on which power conversion module 101 is disposed, such that heat transfer member 102 is interposed between cooling surface 1051 and each of first core 6031 and second core 6032. First core 6031 and second core 6032 are arranged side by side in the direction perpendicular to the magnetic flux inside winding 104 that is generated by the current flowing through winding 104.

In this way, in the present fifth embodiment, first core 6031 and second core 6032 are arranged side by side on cooling surface 1051 of cooling body 105. Thereby, first core 6031 and second core 6032 are filled with a magnetic flux generated inside winding 104, and thus, the inductance value of reactor 120 formed by first core 6031, second core 6032, and winding 104 can be determined.

In power converter 600 configured as described above, first core 6031 and second core 6032 each have a rectangular parallelepiped shape, first core 6031 and second core 6032 are disposed on cooling surface 1051, the area of cooling surface 1051 is larger than the areas of first core 6031 and second core 6032 in a plan view, and winding 104 is wound around first core 6031, second core 6032, and cooling body 105. Thus, first core 6031, second core 6032, and winding 104 can be brought into contact with cooling surface 1051. Thereby, the effect of cooling first core 6031, second core 6032, and winding 104 can be improved, so that the reliability of the power converter can be enhanced.

Further, since the effect of cooling first core 6031, second core 6032, and winding 104 is improved, reactor 120 itself can be reduced in size, with the result that a small-sized and low-cost power converter can be implemented.

Further, first core 6031 and second core 6032 each having a rectangular parallelepiped shape alleviates the limitation imposed due to the core shape on the number of times that winding 104 is wound around first core 6031 and second core 6032. Thus, the degree of design freedom for the inductance value of reactor 120 can be increased.

Further, the number of times that winding 104 is wound around first core 6031, second core 6032, and cooling body 105 can be readily adjusted, so that a power converter with a high degree of design freedom is implemented.

Further, since power conversion module 101 and reactor 120 that includes first core 6031, second core 6032, and winding 104 are disposed on the same cooling body 105, a small-sized power converter can be implemented.

Further, since the distance (interval) between power conversion module 101 and reactor 120 is reduced, the surge voltage generated at the terminal of reactor 120 can be decreased.

Further, first core 6031 and second core 6032 can be made using a commercially available ferrite core, and cooling body 105 can be formed by applying a commercially available heat sink. Thus, a low-cost power converter with a high degree of design freedom can be implemented through the use of inexpensive general-purpose components.

Further, first core 6031 and second core 6032 are arranged side by side in the direction perpendicular to the magnetic flux inside winding 104 that is generated by the current flowing through winding 104. Thereby, the inductance value can be adjusted in accordance with the number of cores 103, and thus, a power converter with a high degree of design freedom can be implemented.

Further, since a general-purpose core is used as a core, a desired inductance is implemented, and thereby, the component members can be reduced in cost, so that a low-cost power converter can be implemented.

Although the present fifth embodiment shows the case where two cores are provided, the number of cores is not particularly limited to two, but the same effect can also be achieved even when a larger number of cores are used.

Sixth Embodiment

The sixth embodiment is different from the first embodiment in that core 103 used in the first embodiment is disposed on a cooling surface 1051 different from cooling surface 1051 on which power conversion module 101 is disposed. In this way, since power conversion module 101 and core 103 are placed on different cooling surfaces 1051 of cooling body 105, a high effect of cooling each of power conversion module 101 and core 103 is achieved, and thus, a power converter with a high degree of design freedom can be implemented. Since other features are the same as those in the first embodiment, the detailed description thereof will not be repeated.

Figure 15:
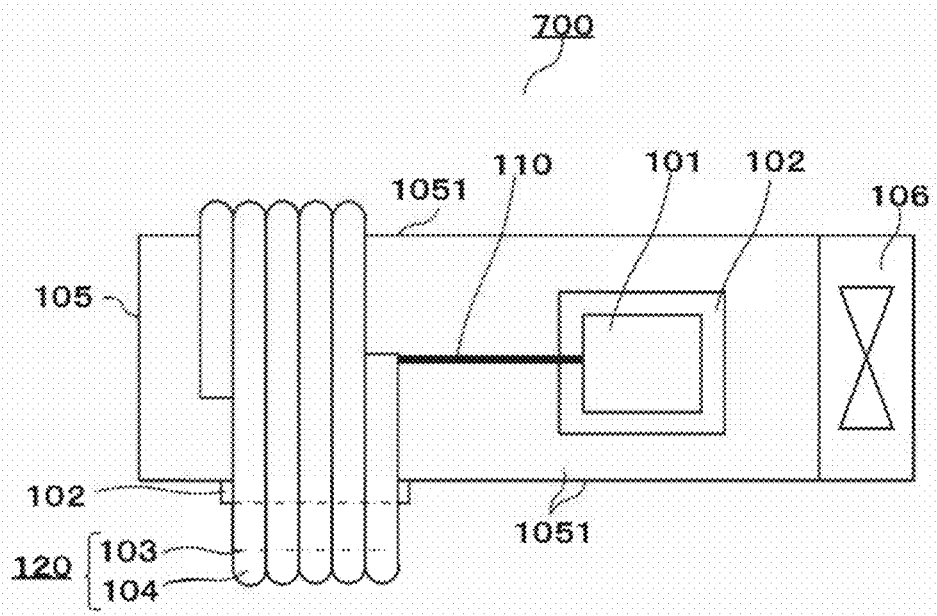
FIG. 15 is a schematic plan view showing a structure of a power converter according to the sixth embodiment of the present invention.
Figure 16:
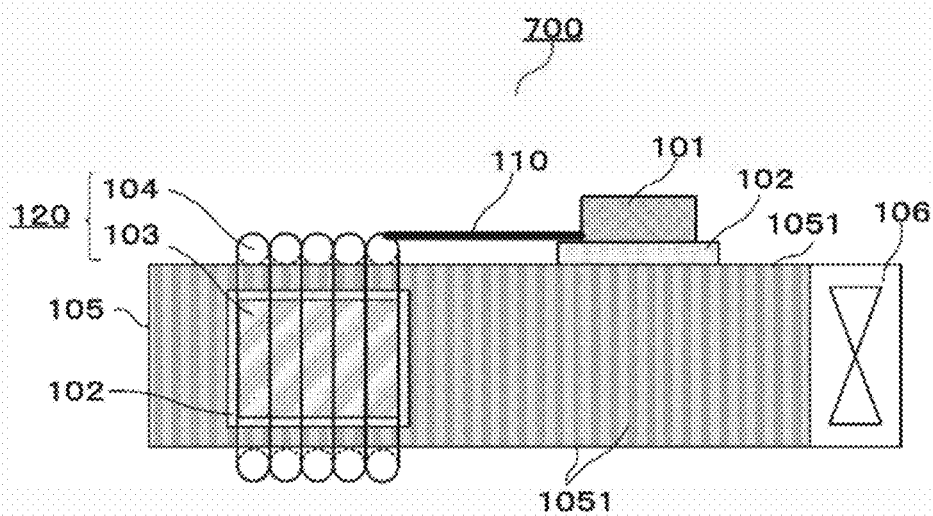
FIG. 16 is a schematic side view showing the structure of the power converter according to the sixth embodiment of the present invention.

FIG. 15 is a schematic plan view showing a structure of a power converter according to the sixth embodiment of the present invention. FIG. 16 is a schematic side view showing the structure of the power converter according to the sixth embodiment of the present invention. In the figures, a power converter 700 includes a power conversion module 101, a heat transfer member 102, a core 103 as a core portion, a winding 104 as a winding portion, a reactor 120, a cooling body 105 as a cooling member, a cooling fan 106, a wire 110, and a cooling surface 1051. In FIG. 15, a dashed-dotted line shows heat transfer member 102 in a region covered with winding 104, and a chain double-dashed line shows core 103. In FIG. 16, winding 104 is transparent so as to transparently show heat transfer member 102, core 103, and cooling body 105 around which winding 104 is wound.

In FIGS. 15 and 16, cooling body 105 has a plurality of cooling surfaces 1051. Core 103 is disposed on a cooling surface 1051 of cooling body 105 with heat transfer member 102 interposed therebetween. In this case, cooling surface 1051 on which core 103 is disposed is different from cooling surface 1051 on which power conversion module 101 is disposed. In FIGS. 15 and 16, assuming that cooling surface 1051 on which power conversion module 101 is disposed is defined as an upper surface of cooling body 105, core 103 is disposed on cooling surface 1051 on the side surface side of cooling body 105. Core 103 is disposed on the left side surface of cooling body 105 in a view seen from the cooling fan 106 side. Cooling surface 1051 different from first cooling surface 1051 is located at the position opposite to (facing) a third cooling surface 1051. The third cooling surface corresponds to cooling surface 1051 opposite to cooling surface 1051 on which core 103 is disposed. Winding 104 is wound to cover the entire surface of the region corresponding to the position where core 103 is located on third cooling surface 1051 that faces cooling surface 1051 different from first cooling surface 1051 of cooling body 105 on which core 103 is disposed. In other words, winding 104 covers the entire surface of the corresponding region on the side opposite to the position where core 103 is disposed on cooling surface 1051 different from (the corresponding region of cooling surface 1051 facing) first cooling surface 1051 of cooling body 105.

In this way, in the present sixth embodiment, since power conversion module 101 and core 103 are disposed on different cooling surfaces 1051 of cooling body 105, a high effect of cooling each of power conversion module 101 and core 103 is achieved, and also, a power converter with a high degree of design freedom can be implemented.

In power converter 700 configured as described above, core 103 has a rectangular parallelepiped shape, core 103 is disposed on cooling surface 1051, the area of cooling surface 1051 is larger than the area of core 103 in a plan view, and winding 104 is wound around core 103 and cooling body 105. Thus, core 103 and winding 104 can be brought into contact with cooling surface 1051, and thereby, the effect of cooling core 103 and winding 104 can be improved, so that the reliability of the power converter can be enhanced.

Further, since the effect of cooling core 103 and winding 104 is improved, reactor 120 itself can be reduced in size, so that a small-sized and low-cost power converter can be implemented.

Further, core 103 having a rectangular parallelepiped shape alleviates the limitation imposed due to the core shape on the number of times that winding 104 is wound around core 103. Thus, the degree of design freedom for the inductance value of reactor 120 can be increased.

Further, the number of times that winding 104 is wound around core 103 and cooling body 105 can be readily adjusted, so that a power converter with a high degree of design freedom is implemented.

Further, since power conversion module 101 and reactor 120 that includes core 103 and winding 104 are disposed on the same cooling body 105, a small-sized power converter can be implemented.

In addition, since the distance (interval) between power conversion module 101 and reactor 120 is reduced, the surge voltage generated at the terminal of reactor 120 can be decreased.

Further, core 103 can be made using a commercially available ferrite core, and cooling body 105 can be formed by applying a commercially available heat sink. Thus, a low-cost power converter with a high degree of design freedom can be implemented through the use of inexpensive general-purpose components.

Further, power conversion module 101 and core 103 are disposed on different cooling surfaces 1051 of cooling body 105. Thus, the effect of cooling each of power conversion module 101 and core 103 can be enhanced, so that a power converter with a high degree of design freedom can be implemented.

The present sixth embodiment shows the case where core 103 is disposed on one side surface (the left side surface) of cooling body 105, but the position of the core is not limited thereto. The same effect can also be achieved, for example, even when core 103 is disposed on cooling surface 1051 on another side surface (the right side surface) of cooling body 105 and the lower surface side of cooling body 105.

Seventh Embodiment

The seventh embodiment is different in core 103 used in the first embodiment in the point that a plurality of (two) cores 103 including a first core 8031 and a second core 8032 are disposed respectively on: a cooling surface 1051 of cooling body 105 on which power conversion module 101 is disposed; and a cooling surface 1051 of cooling body 105 on which power conversion module 101 is not disposed. Thus, first core 8031 is disposed on the same cooling surface 1051 of cooling body 105 as cooling surface 1051 on which power conversion module 101 is disposed while second core 8032 is disposed on a different cooling surface 1051 of cooling body 105 from cooling surface 1051 on which power conversion module 101 is disposed. Accordingly, the effect of cooling each of power conversion module 101, first core 8031, and second core 8032 can be enhanced. Also, since the inductance value can be determined in accordance with first core 8031 and second core 8032, a power converter with a high degree of design freedom can be implemented. Since other features are the same as those in the first embodiment, the detailed description thereof will not be repeated.

Figure 17:
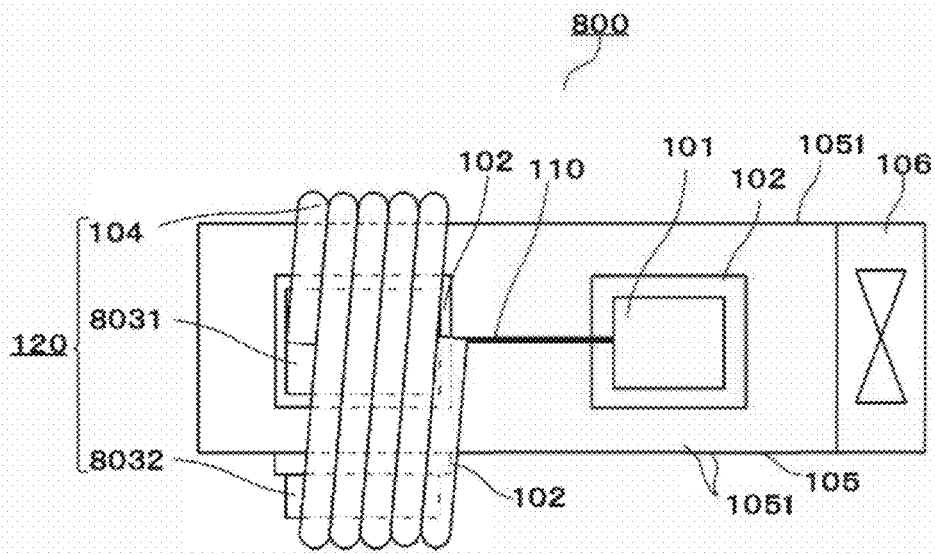
FIG. 17 is a schematic plan view showing a structure of a power converter according to the seventh embodiment of the present invention.
Figure 18:
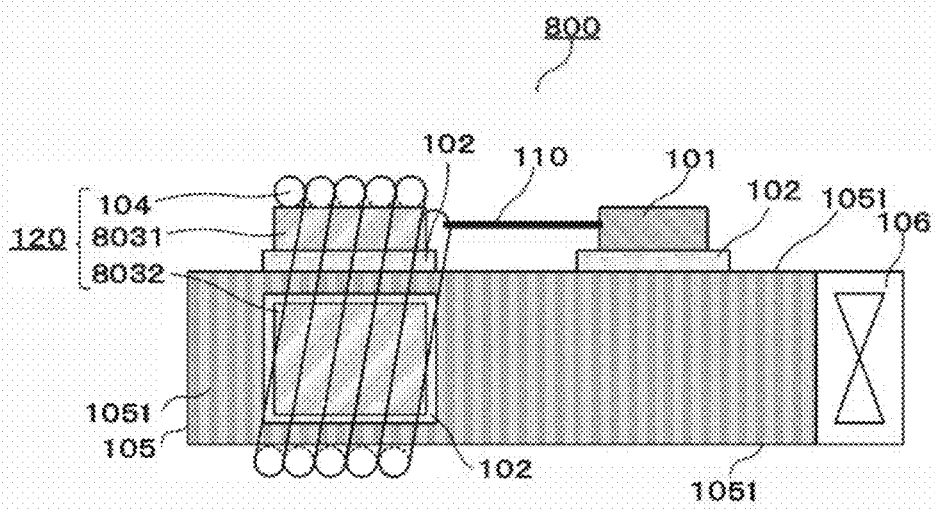
FIG. 18 is a schematic side view showing the structure of the power converter according to the seventh embodiment of the present invention.

FIG. 17 is a schematic plan view showing a structure of a power converter according to the seventh embodiment of the present invention. FIG. 18 is a schematic side view showing the structure of the power converter according to the seventh embodiment of the present invention. In the figures, a power converter 800 includes a power conversion module 101, a heat transfer member 102, a core 8031 as the first core portion, a core 8032 as the second core portion, a winding 104 as a winding portion, a reactor 120, a cooling body 105 as a cooling member, a cooling fan 106, a wire 110, and a cooling surface 1051. In FIG. 17, a dashed-dotted line shows heat transfer member 102 in a region covered with winding 104, and a chain double-dashed line shows core 103. In FIG. 18, winding 104 is transparent so as to transparently show heat transfer member 102, core 8031 as the first core portion, core 8032 as the second core portion, and cooling body 105 around which winding 104 is wound.

In FIGS. 17 and 18, cooling body 105 has a plurality of cooling surfaces 1051. First core 8031 is disposed on cooling surface 1051 of cooling body 105 with heat transfer member 102 interposed therebetween. In this case, cooling surface 1051 on which first core 8031 is disposed is the same as cooling surface 1051 on which power conversion module 101 is disposed. Second core 8032 is disposed on cooling surface 1051 of cooling body 105 with heat transfer member 102 interposed therebetween. In this case, cooling surface 1051 on which second core 8032 is disposed is different from cooling surface 1051 on which power conversion module 101 is disposed. In FIGS. 17 and 18, power conversion module 101 and first core 8031 are disposed on cooling surface 1051 on the upper surface side of cooling body 105. Second core 8032 is disposed on cooling surface 1051 on the side surface side (left side surface) of cooling body 105.

In this way, in the present seventh embodiment, power conversion module 101 and first core portion 8031 are disposed on the same cooling surface 1051 of cooling body 105 while second core portion 8032 is disposed on a different cooling surface 1051 of cooling body 105. Thus, the effect of cooling each of first core portion 8031 and second core portion 8032 can be enhanced through the efficient use of cooling surfaces 1051 of cooling body 105. Further, since first core portion 8031 and second core portion 8032 efficiently utilize cooling surfaces 1051 of cooling body 105, a power converter that achieves a high cooling effect is implemented. Further, since the inductance value can be determined in accordance with first core 8031 and second core 8032, a power converter with a high degree of design freedom can be implemented. Further, since the cores efficiently utilize the cooling surfaces of the cooling body, a power converter that achieves a high cooling effect is implemented.

In power converter 800 configured as described above, first core 8031 and second core 8032 each have a rectangular parallelepiped shape, first core 8031 and second core 8032 are disposed on cooling surface 1051, the area of cooling surface 1051 is larger than the areas of first core 8031 and second core 8032 in a plan view, and winding 104 is wound around first core 8031, second core 8032, and cooling body 105. Thus, first core 8031, second core 8032, and winding 104 can be brought into contact with cooling surface 1051, and thereby, the effect of cooling first core 8031, second core 8032, and winding 104 can be improved, so that the reliability of the power converter can be enhanced.

Further, since the effect of cooling first core 8031, second core 8032, and winding 104 is improved, reactor 120 itself can be reduced in size, and thus, a small-sized and low-cost power converter can be implemented.

Further, first core 8031 and second core 8032 each having a rectangular parallelepiped shape alleviates the limitation imposed due to the core shape on the number of times that winding 104 is wound around first core 8031 and second core 8032. Thus, the degree of design freedom for the inductance value of reactor 120 can be increased.

Further, the number of times that winding 104 is wound around first core 8031, second core 8032, and cooling body 105 can be readily adjusted, so that a power converter with a high degree of design freedom is implemented.

Further, since power conversion module 101 and reactor 120 that includes first core 8031, second core 8032, and winding 104 are disposed on the same cooling body 105, a small-sized power converter can be implemented.

In addition, since the distance (interval) between power conversion module 101 and reactor 120 is reduced, the surge voltage generated at the terminal of reactor 120 can be decreased.

Further, first core 8031 and second core 8032 can be made using a commercially available ferrite core, and cooling body 105 can be formed by applying a commercially available heat sink. Thus, a low-cost power converter with a high degree of design freedom can be implemented through the use of inexpensive general-purpose components.

Further, since first core 8031 and second core 8032 are arranged side by side in the direction perpendicular to the magnetic flux inside winding 104 that is generated by the current flowing through winding 104, the inductance value can be adjusted in accordance with the number of cores 103, so that a power converter with a high degree of design freedom can be implemented.

Further, since a general-purpose core is used as a core, a desired inductance is implemented, and thereby, the component members can be reduced in cost, so that a low-cost power converter can be implemented.

In addition, since power conversion module 101 and first core portion 8031 are disposed on the same cooling surface 1051 of cooling body 105 while second core portion 8032 is disposed on a different cooling surface 1051 of cooling body 105. Thus, the effect of cooling each of first core portion 8031 and second core portion 8032 can be enhanced.

Further, since the inductance value can be determined in accordance with first core 8031 and second core 8032, a power converter with a high degree of design freedom can be implemented.

Although the present seventh embodiment show the case where two cores are provided, the number of cores is not particularly limited to two, but the same effect can also be achieved even when a larger number of cores are used.

In the above description, first core portion 8031 is disposed on cooling surface 1051 on the upper surface side of cooling body 105 while second core portion 8032 is disposed on cooling surface 1051 on the side surface side of cooling body 105, but the arrangement positions of the cores are not limited thereto. The same effect can also be achieved, for example, even when second core portion 8032 is disposed on cooling surface 1051 of another side surface of cooling body 105, such as cooling surface 1051 on the lower surface side of cooling body 105.

Eighth Embodiment

The eighth embodiment is different from the first embodiment in that a capacitor 908 is disposed on the other end side of winding 104 of power converter 100 in the first embodiment. Since capacitor 908 is disposed on the other end side of winding 104 in this way, an LC filter can be formed by reactor 120 and capacitor 908, and thus, a low-noise power converter can be implemented. Since other features are the same as those in the first embodiment, the detailed description thereof will not be repeated.

Figure 19:
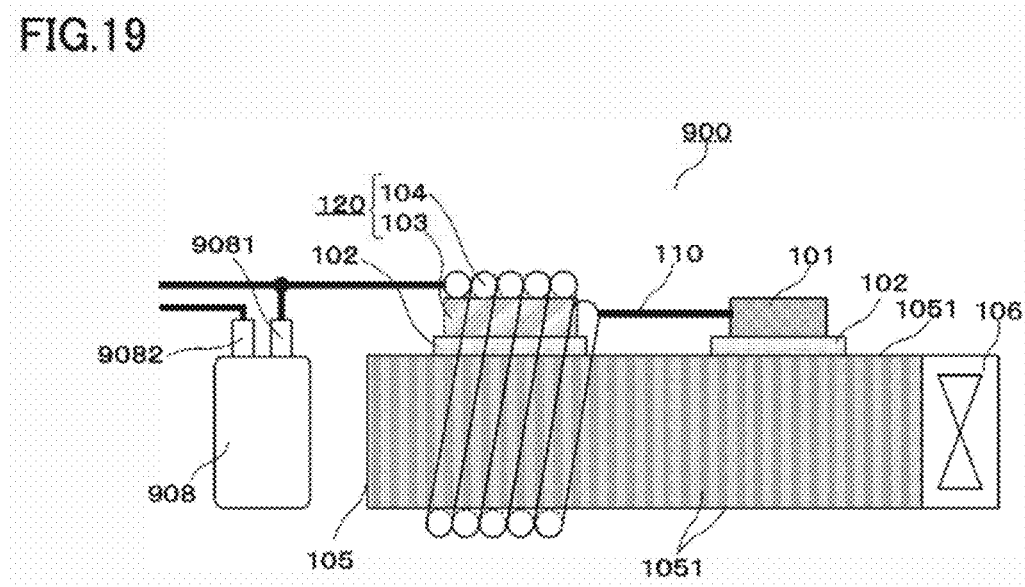
FIG. 19 is a schematic side view showing a structure of a power converter according to the eighth embodiment of the present invention.

FIG. 19 is a schematic side view showing a structure of a power converter according to the eighth embodiment of the present invention. In the figure, a power converter 900 includes a power conversion module 101, a heat transfer member 102, a core 103 as a core portion, a winding 104 as a winding portion, a reactor 120, a cooling body 105 as a cooling member, a cooling fan 106, a wire 110, a cooling surface 1051, and a capacitor 908. In FIG. 19, winding 104 is transparent so as to transparently show heat transfer member 102, core 103, and cooling body 105 around which winding 104 is wound.

In the figure, capacitor 908 has a first terminal 9081 and a second terminal 9082 each serving as an external terminal. Capacitor 908 is connected at first terminal 9081 through wire 110 to one end side of winding 104 on the side opposite to the other end side of winding 104 that is connected to power conversion module 101 through wire 110. In this way, capacitor 908 is connected through wire 110 to reactor 120 formed of core 103 and winding 104, to thereby constitute a well-known LC filter. Second terminal 9082 of capacitor 908 is another external terminal and is connected, for example, to the ground so as to serve as a propagation path for a high-frequency noise in the LC filter.

Capacitor 908 is disposed on the other end side of cooling body 105 that is opposite to the side of cooling body 105 on which cooling fan 106 is disposed. Cooling fan 106 draws in the outside air and causes the air to flow through an internal space of cooling body 105 that is formed by a plurality of cooling surfaces 1051. Then, in capacitor 908, the air having flowed through the internal space of cooling body 105 that is formed by the plurality of cooling surfaces 1051 collides with the body of capacitor 908, so that capacitor 908 is cooled.

In this way, the present eighth embodiment provides an LC filter that is formed of capacitor 908 and reactor 120 that is formed of core 103 and winding 104. Thus, a low-noise power converter can be readily implemented. Further, since capacitor 908 is cooled by the air discharged from cooling body 105, a highly reliable power conversion device can be implemented.

In power converter 900 configured as described above, core 103 has a rectangular parallelepiped shape, core 103 is disposed on cooling surface 1051, the area of cooling surface 1051 is larger than the area of core 103 in a plan view, and winding 104 is wound around core 103 and cooling body 105. Thus, core 103 and winding 104 can be brought into contact with cooling surface 1051, and thereby, the effect of cooling core 103 and winding 104 can be improved, so that the reliability of the power converter can be enhanced.

Further, since the effect of cooling core 103 and winding 104 is improved, reactor 120 itself can be reduced in size, so that a small-sized and low-cost power converter can be implemented.

Further, core 103 having a rectangular parallelepiped shape alleviates the limitation imposed due to the core shape on the number of times that winding 104 is wound around core 103. Thus, the degree of design freedom for the inductance value of reactor 120 can be increased.

Further, the number of times that winding 104 is wound around core 103 and cooling body 105 can be readily adjusted, so that a power converter with a high degree of design freedom is implemented.

Further, since power conversion module 101 and reactor 120 that includes core 103 and winding 104 are disposed on the same cooling body 105, a small-sized power converter can be implemented.

In addition, since the distance (interval) between power conversion module 101 and reactor 120 is reduced, the surge voltage generated at the terminal of reactor 120 can be decreased.

Further, since an LC filter formed of capacitor 908 and reactor 120 that includes core 103 and winding 104 is provided, a low-noise power converter can be readily implemented.

Further, since capacitor 908 is cooled by the air discharged from cooling body 105, a highly reliable power conversion device can be implemented.

In the present eighth embodiment, the same effect can also be achieved even when any one of a well-known electrolytic capacitor, ceramic capacitor, and film capacitor is used as capacitor 908. Although capacitor 908 is configured to be cooled by cooling fan 106, capacitor 908 may be used in combination with another cooler or the like. Further, capacitor 908 may be disposed on cooling surface 1051 of cooling body 105. By disposing capacitor 908 on cooling surface 1051 in this way, power converter 900 can be further reduced in size.

Ninth Embodiment

The ninth embodiment is different in power converter 900 of the eighth embodiment in the point that three power converters 900 are provided and connected in parallel to form a three-phase power converter. Since three power converters 900 are connected in parallel to form a three-phase power converter in this way, the capacitor included in each of the power converters is an across-the-line capacitor (an X capacitor), so that a three-phase power converter with low noise can be implemented. Since other features are the same as those in the first and eighth embodiments, the detailed description thereof will not be repeated.

Figure 20:
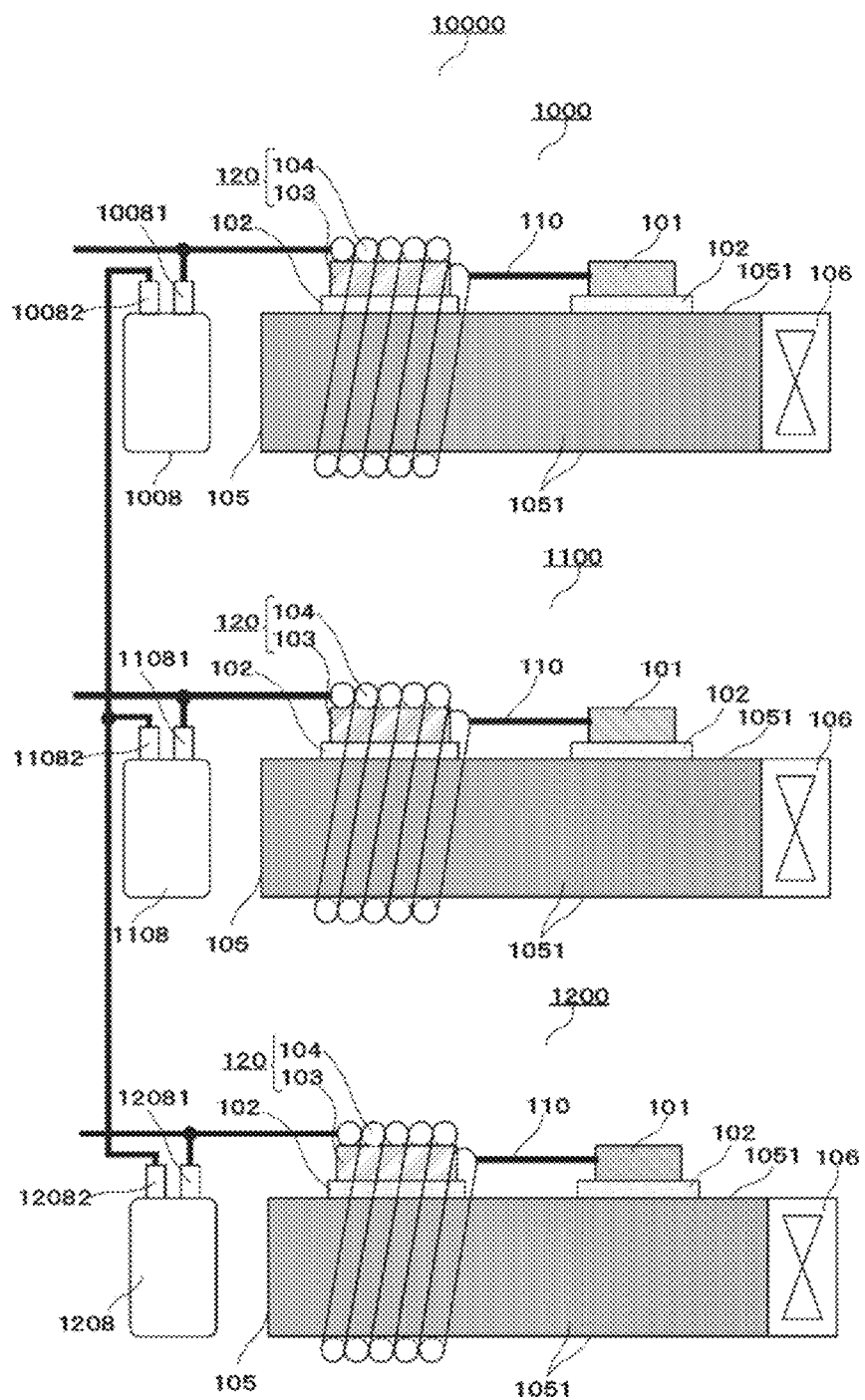
FIG. 20 is a schematic side view showing a structure of a power converter according to the ninth embodiment of the present invention.

FIG. 20 is a schematic side view showing a structure of a power converter according to the ninth embodiment of the present invention. In the figure, a three-phase power converter 10000 includes a first power converter 1000, a second power converter 1100, and a third power converter 1200. First power converter 1000 includes a power conversion module 101, a heat transfer member 102, a core 103 as a core portion, a winding 104 as a winding portion, a reactor 120, a cooling body 105 as a cooling member, a cooling fan 106, a wire 110, a cooling surface 1051, a capacitor 1008, a first terminal 10081, and a second terminal 10082. Second power converter 1100 includes a power conversion module 101, a heat transfer member 102, a core 103 as a core portion, a winding 104 as a winding portion, a reactor 120, a cooling body 105 as a cooling member, a cooling fan 106, a wire 110, a cooling surface 1051, a capacitor 1108, a first terminal 11081, and a second terminal 11082. Third power converter 1200 includes a power conversion module 101, a heat transfer member 102, a core 103 as a core portion, a winding 104 as a winding portion, a reactor 120, a cooling body 105 as a cooling member, a cooling fan 106, a wire 110, a cooling surface 1051, a capacitor 1208, a first terminal 12081, and a second terminal 12082. In the figure, winding 104 is transparent so as to transparently show heat transfer member 102, core 103, and cooling body 105 around which winding 104 is wound. Each of power converters 1000, 1100, and 1200 has a circuit configuration equivalent to one leg of a well-known inversion circuit (an inverter).

In the figure, power converter 10000 is a three-phase power converter formed of first power converter 1000, second power converter 1100, and third power converter 1200. Second terminal 10082 of capacitor 1008 in first power converter 1000, second terminal 11082 of capacitor 1108 in second power converter 1100, and second terminal 12082 of capacitor 1208 in third power converter 1200 are connected at the same potential, and each of capacitor 1008, capacitor 1108, and capacitor 1208 serves as an across-the-line capacitor (an X capacitor). Each of across-the-line capacitors 1008, 1108, and 1208; and core 103 and winding 104 in a corresponding one of power converters 1000, 1100, and 1200 constitute reactor 120 that forms a noise filter to cause a circulation of a high-frequency noise current generated from a corresponding one of power converters 1000, 1100, and 1200. Thereby, the high-frequency noise current can be prevented from flowing to the outside.

In this way, in the present ninth embodiment, first power converter 1000, second power converter 1100, and third power converter 1200 are disposed in parallel, and thus, a three-phase power converter is readily implemented. Further, each of capacitors 1008, 1108, and 1208 in their respective first power converter 1000, second power converter 1100, and third power converter 1200 functions as an across-the-line capacitor, to thereby allow formation of a noise filter that is formed of: reactor 120 including core 103 and winding 104; and a corresponding one of capacitors 1008, 1108, and 1208. Thus, a three-phase power converter with low noise can be readily implemented.

In three-phase power converter 10000 configured as described above, core 103 has a rectangular parallelepiped shape, core 103 is disposed on cooling surface 1051, the area of cooling surface 1051 is larger than the area of core 103 in a plan view, and winding 104 is wound around core 103 and cooling body 105. Thus, core 103 and winding 104 can be brought into contact with cooling surface 1051, and thereby, the effect of cooling core 103 and winding 104 can be improved, so that the reliability of the power converter can be enhanced.

Further, since the effect of cooling core 103 and winding 104 is improved, reactor 120 itself can be reduced in size, so that a small-sized and low-cost power converter can be implemented.

Further, core 103 having a rectangular parallelepiped shape alleviates the limitation imposed due to the core shape on the number of times that winding 104 is wound around core 103. Thus, the degree of design freedom for the inductance value of reactor 120 can be increased.

Further, the number of times that winding 104 is wound around core 103 and cooling body 105 can be readily adjusted, so that a power converter with a high degree of design freedom is implemented.

Further, since power conversion module 101 and reactor 120 that includes core 103 and winding 104 are disposed on the same cooling body 105, a small-sized power converter can be implemented.

In addition, since the distance (interval) between power conversion module 101 and reactor 120 is reduced, the surge voltage generated at the terminal of reactor 120 can be decreased.

Further, each of capacitors 1008, 1108, and 1208 in their respective first power converter 1000, second power converter 1100, and third power converter 1200 function as an across-the-line capacitor, to thereby allow formation of a noise filter that is formed of: reactor 120 including core 103 and winding 104; and a corresponding one of capacitors 1008, 1108, and 1208. Thus, a three-phase power converter with low noise can be readily implemented.

Further, since capacitors 1008, 1108, and 1208 are cooled by the air discharged from their respective cooling bodies 105, a highly reliable power conversion device can be implemented.

It should be understood that the above-described embodiments are illustrative and non-restrictive in every respect. The scope of the present invention is defined by the terms of the claims, rather than the description above, and is intended to include any modifications within the meaning and scope equivalent to the terms of the claims. Further, the invention may be implemented by appropriately combining a plurality of constituent elements disclosed in the above embodiments.

REFERENCE SIGNS LIST

100, 200, 300, 400, 500, 600, 700, 800, 900 power converter, 101 power conversion module, 102 heat transfer member, 103 core, 104 winding, 105 cooling body, 106 cooling fan, 110 wire, 120 reactor, 507 fixing tool, 908 capacitor, 1000 first power converter, 1051 cooling surface, 1100 second power converter, 1200 third power converter, 3051, 3052, 4051, 4052 groove, 5071, 5072 screw hole, 6031, 8031 first core, 6032, 8032 second core, 9081, 10081, 11081, 12081 first terminal, 9082, 10082, 11082, 12082 second terminal, 10000 three-phase power converter.

The invention claimed is:

1. A power converter comprising:
   a cooler having a first cooling surface;
   a reactor including a core portion and a winding portion, wherein the core portion is a rectangular parallelepiped and disposed on the first cooling surface that is larger in area than the core portion in a plan view, and the winding portion is wound around the core portion and the cooler; and
   a converter connected to one end of the winding portion.

2. The power converter according to claim 1, wherein the winding portion is wound around the core portion and the cooler while being in contact with the core portion and the cooler.

3. The power converter according to claim 1, wherein:
   the cooler has a second cooling surface opposite to the first cooling surface, and
   the winding portion covers an entire surface of a region of the second cooling surface that corresponds to a position of the core portion disposed on the first cooling surface.

4. The power converter according to claim 1, wherein a part of the winding portion is wound around the cooler on an outer circumferential side of a region where the core portion is disposed.

5. The power converter according to claim 1, wherein the cooler is provided with a groove portion on which the winding portion is disposed to extend around the cooler.

6. The power converter according to claim 5, wherein the groove portion has a depth in which the winding portion is buried in the cooler.

7. The power converter according to claim 1, wherein the cooler further includes a fixing member on each of both sides, between which the winding portion is sandwiched.

8. The power converter according to claim 1, wherein the converter is disposed on the first cooling surface.

9. The power converter according to claim 8, wherein:
   a plurality of core portions are provided,
   one core portion of the core portions is further disposed on another cooling surface different from the first cooling surface,
   the cooler has a third cooling surface opposite to the another cooling surface, and
   the winding portion covers an entire surface of a region of the third cooling surface that corresponds to a position of the one core portion disposed on the another cooling surface.

10. The power converter according to claim 1, wherein the converter is disposed on a cooling surface different from the first cooling surface.

11. The power converter according to claim 1, further comprising a capacitor connected to an other end of the winding portion.

12. A power converter comprising a plurality of power converters according to claim 1, wherein
   the power converters are connected in parallel.

* * * * *